(12) United States Patent
Matsuda

(10) Patent No.: US 9,709,129 B2
(45) Date of Patent: Jul. 18, 2017

(54) TRANSMISSION BELT

(71) Applicant: BANDO CHEMICAL INDUSTRIES, LTD., Kobe-shi (JP)

(72) Inventor: Hisashi Matsuda, Kobe (JP)

(73) Assignee: BANDO CHEMICAL INDUSTRIES, LTD., Kobe-shi (JP)

( * ) Notice: Subject to any disclaimer, the term of this patent is extended or adjusted under 35 U.S.C. 154(b) by 229 days.

(21) Appl. No.: 14/590,744

(22) Filed: Jan. 6, 2015

(65) Prior Publication Data
US 2015/0148165 A1 May 28, 2015

Related U.S. Application Data

(63) Continuation of application No. PCT/JP2013/004175, filed on Jul. 4, 2013.

(30) Foreign Application Priority Data

Jul. 6, 2012 (JP) ................................ 2012-152102

(51) Int. Cl.
| | |
|---|---|
| *F16G 1/21* | (2006.01) |
| *F16G 1/10* | (2006.01) |
| *F16G 5/20* | (2006.01) |
| *B29D 29/10* | (2006.01) |
| *F16G 5/08* | (2006.01) |

(52) U.S. Cl.
CPC ............. *F16G 1/21* (2013.01); *B29D 29/103* (2013.01); *F16G 1/10* (2013.01); *F16G 5/08* (2013.01); *F16G 5/20* (2013.01)

(58) Field of Classification Search
CPC ........................................................ F16G 1/21
See application file for complete search history.

(56) References Cited

U.S. PATENT DOCUMENTS

| | | | | |
|---|---|---|---|---|
| 6,132,328 | A | 10/2000 | Kinoshita et al. | |
| 7,056,250 | B2* | 6/2006 | Burrowes | C08L 21/00 474/237 |
| 7,201,688 | B2* | 4/2007 | Wu | F16G 5/20 474/237 |
| 7,235,028 | B2* | 6/2007 | Martin | B29D 29/08 474/264 |
| 7,655,729 | B2* | 2/2010 | Burrowes | C08L 23/16 474/264 |

(Continued)

FOREIGN PATENT DOCUMENTS

| | | |
|---|---|---|
| CN | 101160478 A | 4/2008 |
| EP | 1217253 A2 | 6/2002 |

(Continued)

OTHER PUBLICATIONS

International Search Report in related International Application No. PCT/JP2013/004175 dated Sep. 24, 2013.

*Primary Examiner* — William E Dondero
*Assistant Examiner* — Mark K Buse
(74) *Attorney, Agent, or Firm* — Knobbe Martens Olson & Bear LLP

(57) ABSTRACT

At least part of a belt body of a transmission belt contacting a cord is made of a rubber composition containing ethylene-α-olefin elastomer as a rubber component and formed in such a manner that the rubber component is mixed with α,β-unsaturated fatty acid metallic salt and then is cross-linked using sulfur.

9 Claims, 5 Drawing Sheets

(56) References Cited

U.S. PATENT DOCUMENTS

| | | | | |
|---|---|---|---|---|
| 7,909,720 B2* | 3/2011 | Burrowes | ............... | F16G 1/28 474/205 |
| 8,030,404 B2* | 10/2011 | Burrowes | ............... | C08L 23/16 474/264 |
| 9,353,827 B2* | 5/2016 | Uchigashima | ............ | F16G 1/28 |
| 2002/0042317 A1 | 4/2002 | South | | |
| 2006/0148603 A1* | 7/2006 | Burrowes | ............... | F16G 1/28 474/266 |
| 2009/0011884 A1* | 1/2009 | Nakashima | ............... | F16G 5/20 474/205 |
| 2009/0075770 A1 | 3/2009 | Yoshida et al. | | |
| 2009/0081473 A1 | 3/2009 | Ohno | | |
| 2010/0069190 A1* | 3/2010 | Yoshida | ............ | C08L 23/0815 474/265 |
| 2010/0190914 A1* | 7/2010 | Burrowes | ............... | C08L 23/16 524/517 |
| 2010/0331129 A1* | 12/2010 | Mukai | ............... | F16G 5/20 474/237 |
| 2011/0111902 A1* | 5/2011 | Well | ............... | B29D 29/08 474/205 |
| 2011/0124453 A1* | 5/2011 | Nakashima | ............... | F16G 1/10 474/139 |
| 2011/0300981 A1* | 12/2011 | Takahashi | ............. | C08K 3/346 474/264 |
| 2012/0058849 A1* | 3/2012 | Yoshida | ............... | B29D 29/103 474/148 |

FOREIGN PATENT DOCUMENTS

| | | |
|---|---|---|
| JP | 2004-507679 A | 3/2004 |
| JP | 2004149728 | 5/2004 |
| JP | 2008-304053 A | 12/2008 |
| JP | 2009-275781 A | 11/2009 |
| WO | 2007/110974 A1 | 10/2007 |
| WO | 2010/047029 A1 | 8/2009 |

* cited by examiner

TRANSMISSION BELT

CROSS-REFERENCE TO RELATED APPLICATIONS

This is a continuation of International Application No. PCT/JP2013/004175 filed on Jul. 4, 2013, which claims priority to Japanese Patent Application No. 2012-152102 filed on Jul. 6, 2012. The entire disclosures of these applications are incorporated by reference herein.

BACKGROUND

The present disclosure relates to a transmission belt.

Typically in transmission belts such as V-belts and V-ribbed belts, belt bodies are made of a rubber composition, and cords made of a fibrous material are embedded in the belt bodies. If such a transmission belt is wrapped around pulleys with high tension or is wrapped around small-diameter pulleys, interfacial detachment occurs due to stress concentration at an interface between the rubber composition forming the belt body and the cord. In some cases, there is a possibility that the cord protrudes from the belt body.

Japanese Translation of PCT Application No. 2004-507679 discloses, as the solution to the foregoing problem, a transmission belt in which an adhesive rubber layer of a belt body in which a cord is embedded is made of a rubber composition having a complex modulus of equal to or greater than 15000 kPa. Moreover, International Publication No. WO 2007/110974 discloses a transmission belt in which an adhesive rubber layer of a belt body in which a cord is embedded is made of a rubber composition whose tensile stress at 10% elongation in a belt length direction at 125° C. is 1.1 to 1.7 MPa.

SUMMARY

The present disclosure is intended for a transmission belt including a cord embedded in a belt body made of a rubber composition. At least part of the belt body contacting the cord is made of a rubber composition containing ethylene-α-olefin elastomer as a rubber component and formed in such a manner that the rubber component is mixed with α,β-unsaturated fatty acid metallic salt and then is cross-linked using sulfur.

DETAILED DESCRIPTION

Embodiments will be described below in detail with reference to drawings.

First Embodiment

Figure 1:
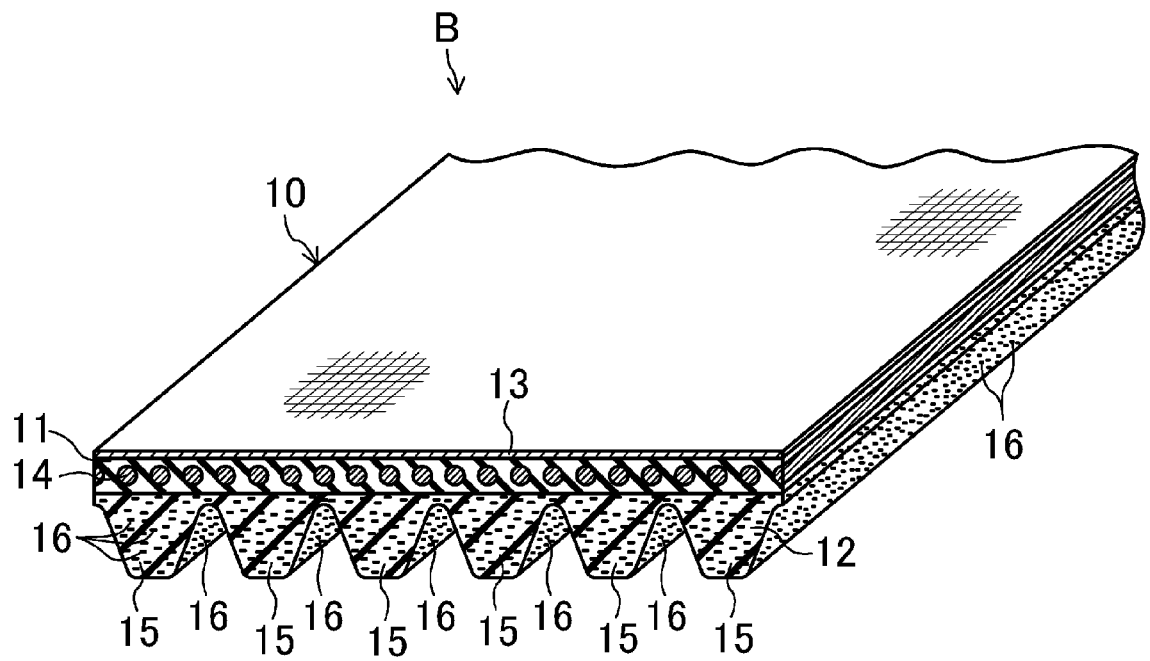
FIG. 1 is a perspective view of a V-ribbed belt of a first embodiment.

FIG. 1 illustrates a V-ribbed belt (transmission belt) B of a first embodiment. The V-ribbed belt B of the first embodiment is, e.g., an endless belt used for an accessory drive belt transmission system provided in an engine room of an automobile. The V-ribbed belt B of the first embodiment has, e.g., a length of 500 to 3000 mm, a width of 10 to 36 mm, and a thickness of 4.0 to 4.8 mm.

The V-ribbed belt B of the present embodiment includes a V-ribbed belt body 10 having a double-layer structure of an adhesive rubber layer 11 forming an outer part of the V-ribbed belt body 10 and a compression rubber layer 12 forming an inner part of the V-ribbed belt body 10. A reinforcement fabric 13 is bonded to an outer surface of the V-ribbed belt body 10. In the adhesive rubber layer 11, a cord 14 is embedded so as to form a helical pattern with pitch in a belt width direction.

The adhesive rubber layer 11 is formed in a strip shape so as to have a horizontally-oriented rectangular cross section, and has, e.g., a thickness of 0.4 to 1.5 mm. The adhesive rubber layer 11 is made of a rubber composition formed in such a manner that a rubber component and compounding ingredients are mixed and kneaded to form a non-cross-linked rubber composition and that the non-crosslinked rubber composition is heated and pressurized and is cross-linked using sulfur.

The rubber component of the rubber composition forming the adhesive rubber layer 11 is ethylene-α-olefin elastomer. Examples of ethylene-α-olefin elastomer include ethylene-α-olefin copolymer rubber and ethylene-α-olefin-dienecopolymer rubber. Specifically, the examples include ethylene-propylene-dienemonomer rubber (EPDM), ethylene-propylene copolymer rubber (EPM), ethylene-butene copolymer rubber (EBM), and ethylene-octene copolymer rubber (EOM). It is preferable that α-olefin is at least one chosen from propylene, butene, hexene, or octene. Of these materials, ethylene-α-olefin-dienecopolymer rubber is preferably used because of excellent thermal resistance and excellent cold resistance. Part of ethylene-α-olefin elastomer may be halogen-substituted. A single type of ethylene-α-olefin elastomer may be used alone as the rubber component, or plural types of ethylene-α-olefin elastomer may be blended into the rubber component. Note that the rubber component may contain, at a content of less than 50% by mass, a rubber component(s) other than ethylene-α-olefin elastomer.

The rubber composition forming the adhesive rubber layer 11 contains sulfur and α,β-unsaturated fatty acid metallic salt as the compounding ingredients. The rubber composition forming the adhesive rubber layer 11 further contains, as the compounding ingredients other than the foregoing, e.g., carbon black, silica, an organic reinforcer, a vulcanization assistant, a vulcanization accelerator, an antioxidant, and a silane coupling agent.

Considering improvement of the adhesive force between the adhesive rubber layer 11 and the cord 14 and reduction in detachment at the interface between the adhesive rubber layer 11 and the cord 14 by reducing heat generation of the V-ribbed belt B in belt running, the content of sulfur is preferably equal to or greater than 2 parts by mass with respect to 100 parts by mass of the rubber component, and more preferably equal to or greater than 2.5 parts by mass. Considering the same point as above, the content of sulfur is preferably equal to or less than 4 parts by mass with respect to 100 parts by mass of the rubber component, and more preferably equal to or less than 3.5 parts by mass with respect to 100 parts by mass of the rubber component.

A metal oxide and α,β-unsaturated fatty acid react with each other to form α,β-unsaturated fatty acid metallic salt. Examples of α,β-unsaturated fatty acid include α,β-monoethylenic unsaturated carboxylic acids such as methacrylic acid, acrylic acid, itaconic acid, and crotonic acid. Examples of metal include zinc, magnesium, sodium, lithium, and aluminum. In particular, zinc or magnesium which is divalent metal is preferable. Specifically, examples of α,β-unsaturated fatty acid metallic salt include zinc dimethacrylate, magnesium dimethacrylate, and zinc diacrylate. A single type of α,β-unsaturated fatty acid metallic salt or plural types of α,β-unsaturated fatty acid metallic salt may be used.

Considering improvement of the adhesive force between the adhesive rubber layer 11 and the cord 14, the content of α,β-unsaturated fatty acid metallic salt is preferably equal to or greater than 0.5 part by mass with respect to 100 parts by mass of the rubber component, and more preferably equal to or greater than 1.0 part by mass with respect to 100 parts by mass of the rubber component. Considering the same point as above, the content of α,β-unsaturated fatty acid metallic salt is preferably equal to or less than 5.0 parts by mass with respect to 100 parts by mass of the rubber component, and more preferably equal to or less than 4.0 parts by mass with respect to 100 parts by mass of the rubber component.

Examples of carbon black include furnace blacks (e.g., SAF, ISAF, N-339, HAF, N-351, MAF, FEF, SRF, GPF, ECF, and N-234), thermal blacks (e.g., FT and MT), channel blacks (e.g., EPC and CC), and acetylene blacks. A single type of carbon black or plural types of carbon black may be used. Considering improvement of the adhesive force between the adhesive rubber layer 11 and the cord 14 and prevention of protrusion of the cord 14 from the adhesive rubber layer 11 by excellent flex resistance of the adhesive rubber layer 11 and by excellent flexibility and rubber elasticity of the adhesive rubber layer 11, the content of carbon black is preferably equal to or greater than 10 parts by mass with respect to 100 parts by mass of the rubber component, and more preferably equal to or greater than 20 parts by mass with respect to 100 parts by mass of the rubber component. Moreover, the content of carbon black is preferably equal to or less than 60 parts by mass with respect to 100 parts by mass of the rubber component, and more preferably equal to or less than 55 parts by mass with respect to 100 parts by mass of the rubber component.

Examples of silica include silica formed by various methods such as a sol-gel method, a wet method, and a dry method. In particular, silica formed by the wet method is preferable, considering a reinforcement effect, low heat generation characteristics, and friction characteristics in moistening. Although the microstructure of silica is not limited, a BET adsorption specific surface area is preferably 50 to 200 cm$^2$/g, considering enhancement of the interaction with rubber molecules. The content of silica is preferably equal to or greater than 20 parts by mass with respect to 100 parts by mass of the rubber component, and more preferably equal to or greater than 30 parts by mass with respect to 100 parts by mass of the rubber component. Moreover, the content of silica is preferably equal to or less than 100 parts by mass with respect to 100 parts by mass of the rubber component, and more preferably equal to or less than 90 parts by mass with respect to 100 parts by mass of the rubber component. The content of silica is preferably equal to or greater than 75% by mass with respect to the content of carbon black, and more preferably equal to or greater than 80% by mass with respect to the content of carbon black. The content of silica is preferably equal to or less than 1000% by mass with respect to the content of carbon black, and more preferably equal to or less than 900% by mass with respect to the content of carbon black.

The total content of silica and carbon black is preferably equal to or greater than 70 parts by mass with respect to 100 parts by mass of the rubber component, and more preferably equal to or greater than 75 parts by mass with respect to 100 parts by mass of the rubber component. On the other hand, the total content of silica and carbon black is preferably equal to or less than 100 parts by mass with respect to 100 parts by mass of the rubber component, and more preferably equal to or less than 90 parts by mass with respect to 100 parts by mass of the rubber component.

Examples of the organic reinforcer include phenol resin, high-styrene resin, coumarone-indene resin, amino resin, vinyl toluene resin, lignin resin, butylphenol acetylene resin, and xylene-formaldehyde resin. Of these materials, thermoset phenol resin and melamine resin are preferable, considering further improvement of the adhesive force between the adhesive rubber layer 11 and the cord 14 and a higher durability enhancement effect of the V-ribbed belt B by reduction in detachment at the interface between the adhesive rubber layer 11 and the cord 14. A single type of organic reinforcer or plural types of organic reinforcer may be used. Considering excellent friction resistance and flex resistance of the adhesive rubber layer 11 and excellent flexibility and rubber elasticity of the adhesive rubber layer 11, the content of the organic reinforcer is preferably 0.5 to 3.0 parts by mass with respect to 100 parts by mass of the rubber component.

Examples of the vulcanization assistant include metal oxides such as a magnesium oxide and a zinc oxide, metal carbonates, fatty acids such as stearic acid, and derivatives thereof. A single type of vulcanization assistant or plural types of vulcanization assistant may be used. The content of the vulcanization assistant is preferably 3.0 to 10 parts by mass with respect to 100 parts by mass of the rubber component.

Considering reduction in protrusion of the cord 14 from the adhesive rubber layer 11, the rubber composition forming the adhesive rubber layer 11 preferably has a complex modulus of equal to or greater than 20 MPa at 120° C. Considering the same point as above, the rubber composition forming the adhesive rubber layer 11 preferably has a complex modulus of equal to or less than 30 MPa at 120° C.

The compression rubber layer 12 is provided such that a plurality of V-ribs 15 forming a pulley contact part are formed so as to extend inward of the V-ribbed belt B. The V-ribs 15 are each formed as a protrusion extending in a circumferential direction and having a substantially inverted triangular cross section, and are arranged in the belt width direction. Each V-rib 15 is formed such that a height is, e.g., 1.5 to 2.5 mm and that a width between base ends is, e.g., 2.3 to 4.7 mm. The number of V-ribs 15 is, e.g., 3 to 10 (FIG. 1 illustrates six V-ribs 15).

The compression rubber layer 12 is made of a rubber composition formed in such a manner that a rubber component and various compounding ingredients are mixed together. Examples of the rubber composition include ethylene-propylene-dienemonomer rubber (EPDM), chloroprene rubber (CR), and hydrogenated acrylonitrile rubber (H-NBR). Examples of the compounding ingredients include a crosslinker, a vulcanization assistant, a vulcanization accelerator, an antioxidant, a plasticizer, a reinforcer, a filler, short fibers, and hollow particles. Note that the rubber composition forming the compression rubber layer 12 is formed in such a manner that the rubber component and the compounding ingredients are mixed and kneaded to form a non-crosslinked rubber composition and that the non-crosslinked rubber composition is heated, pressurized, and crosslinked. Such a rubber composition may be formed in such a manner that the non-crosslinked rubber composition is crosslinked using sulfur as the crosslinker or that the non-crosslinked rubber composition is crosslinked using an organic peroxide as the crosslinker.

The rubber composition forming the compression rubber layer 12 may be mixed with short fibers 16 such as nylon short fibers. In this case, it is preferable that the compression rubber layer 12 contains the short fibers 16 such that the short fibers 16 are aligned in the belt width direction and that the short fibers 16 are provided so as to protrude from a surface of the compression rubber layer 12. Note that not the configuration in which the rubber composition forming the compression rubber layer 12 is mixed with the short fibers 16 but the configuration in which the short fibers 16 adhere to the surface of the compression rubber layer 12 may be employed.

The reinforcement fabric 13 is a woven fabric such as a plain-woven fabric formed of warps and wefts of polyester fibers or warps and wefts of cotton. In order to produce adhesiveness to the V-ribbed belt body 10, the treatment for dipping a woven fabric in a resorcin formalin latex aqueous solution (hereinafter referred to as an "RFL aqueous solution") and heating the woven fabric and the adhesion treatment for coating a woven fabric part to be on the side close to the V-ribbed belt body 10 with rubber cement and drying the woven fabric are performed before formation of the reinforcement fabric 13. The reinforcement fabric 13 has a thickness of, e.g., 0.5 to 2.0 mm.

The cord 14 is disposed so as to form the helical pattern with pitch in the belt width direction, and the pitch of the helical pattern is, e.g., 0.6 to 1.5 mm.

The cord 14 is made of a fibrous material. Examples of the fibrous material forming the cord 14 include polyethylene terephthalate (PET) fibers, polyvinyl alcohol (PVA) fibers, polyethylene naphthalate (PEN) fibers, para-aramid fibers, meta-aramid fibers, 4,6 nylon fibers, 6,6 nylon fibers, carbon fibers, and glass fibers. A single type of fibrous material may form the cord 14 alone, or plural types of fibrous material may be mixed together to form the cord 14. The fineness of the fibrous material forming the cord 14 is, e.g., 200 to 5000 dtex, and the filament diameter of the fibrous material forming the cord 14 is, e.g., 0.003 to 0.030 mm. The total fineness of the fibrous material forming the cord 14 is, e.g., 2000 to 18000 dtex. The outer diameter of the cord 14 is, e.g., equal to or greater than 0.4 to 2.2 mm.

Examples of the yarn structure of the cord 14 include single twist yarns, plied yarns, lang lay yarns, and braid yarns. Of these yarns, the single twist yarns and the plied yarns are preferable.

In the case where the cord 14 is formed of single twist yarns, the number of twists is, e.g., 2 to 60 T/10 cm. The cord 14 formed of the single twist yarns may be formed of S-twisted yarns, Z-twisted yarns, or both of S-twisted yarns and Z-twisted yarns forming a double-helical pattern.

In the case where the cord 14 is formed of piled yarns, the fineness of each first twist yarn is, e.g., 600 to 5000 dtex. The number of twist of each first twist yarn is, e.g., 2 to 60 T/10 cm. The number of first twist yarns is, e.g., 2 to 20. The number of twist of each second twist yarn is, e.g., equal to or greater than 2 T/10 cm. The cord 14 may be formed of the piled yarns such that the second twist yarns are S-twisted yarns or Z-twisted yarns. Alternatively, the cord 14 may be formed of both of S-twisted yarns and Z-twisted yarns forming a double-helical pattern.

In order to produce adhesiveness to the adhesive rubber layer 11 of the V-ribbed belt body 10, the adhesion treatment for dipping yarns in an RFL aqueous solution and heating the yarns and/or the adhesion treatment for dipping the yarns in rubber cement and drying the yarns are performed before formation of the cord 14.

The RFL aqueous solution used for the adhesion treatment is a mixture of latex with an initial condensate of resorcin and formaldehyde. The molar ratio of resorcin (R) to formalin (F) is, e.g., R/F=1/1 to 1/2. Examples of latex include vinylpyridine-styrene-butadiene rubber latex (Vp·SBR), chloroprene rubber latex (CR), and chlorosulfonated polyethylene rubber latex (CSM). A single type of latex or plural types of latex may be used. The mass ratio of the initial condensate (RF) of resorcin and formaldehyde to latex (L) is, e.g., RF/L=1/5 to 1/20.

The rubber cement used for the adhesion treatment is formed in such a manner that a non-crosslinked rubber composition dissolves in, e.g., a solvent of toluene. Examples of the non-crosslinked rubber composition contained in the rubber cement include the non-crosslinked rubber composition before formation of the adhesive rubber layer 11. Thus, the non-crosslinked rubber composition contained in the rubber cement may contain the rubber component which is ethylene-α-olefin elastomer, and may be mixed with α,β-unsaturated fatty acid metallic salt.

It is preferable that the adhesion treatment for dipping yarns to be the cord 14 in a undercoating agent formed in such a manner that epoxy or isocyanate (blocked isocyanate) dissolves in, e.g., a solvent of toluene or disperses in water and heating the yarns is performed before the adhesion treatment using the RFL aqueous solution and/or the rubber cement.

If the complex modulus of the rubber composition forming the adhesive rubber layer is merely increased as in the transmission belt disclosed in Japanese Translation of PCT Application No. 2004-507679, the stiffness in a belt length direction becomes too high. Particularly in the case where the transmission belt is wrapped around small pulleys, it is likely that the durability of the transmission belt is lowered due to great restorative force of the adhesive rubber layer. Moreover, when the rubber composition forming the adhesive rubber layer is merely formed such that the tensile stress thereof at 10% elongation in the belt length direction at 125° C. is 1.1 to 1.7 MPa, particularly if the transmission belt is wrapped around pulleys with high tension, it is likely that the durability of the transmission belt is lowered.

However, according to the V-ribbed belt B of the first embodiment having the foregoing configuration, the adhesive rubber layer 11 of the V-ribbed belt body 10 contacting the cord 14 is made of the rubber composition containing ethylene-α-olefin elastomer as the rubber component and formed in such a manner that the rubber component is mixed with α,β-unsaturated fatty acid metallic salt and then the resultant is crosslinked using sulfur. Thus, the adhesive force between the cord 14 and the V-ribbed belt body 10 can be improved, and the cord 14 can be prevented from detaching from the rubber composition forming the adhesive rubber layer 11. As a result, even if the V-ribbed belt B is wrapped around the pulleys with high tension or wrapped around the small pulleys, sufficient durability can be ensured.

Figure 2:
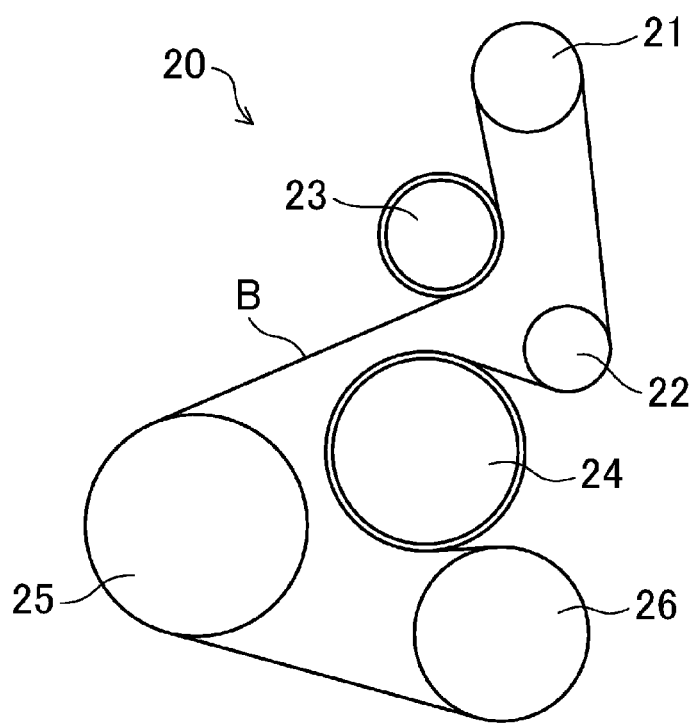
FIG. 2 is a view illustrating the layout of pulleys in an accessory drive belt transmission system for an automobile using the V-ribbed belt of the first embodiment.

FIG. 2 illustrates the layout of pulleys in an accessory drive belt transmission system 20 for automobile using the V-ribbed belt B of the first embodiment. The accessory drive belt transmission system 20 is a serpentine drive type system in which the V-ribbed belt B is wrapped around six pulleys, i.e., four ribbed pulleys and two flat pulleys, to transmit power.

The accessory drive belt transmission system 20 includes a power steering pulley 21 positioned on the uppermost side, an AC generator pulley 22 disposed on a substantially lower right side of the power steering pulley 21, a tensioner pulley 23 which is a flat pulley disposed on a lower left side of the power steering pulley 21 and an upper left side of the AC generator pulley 22, a water pump pulley 24 which is a flat pulley disposed on a lower left side of the AC generator pulley 22 and disposed right below the tensioner pulley 23, a crank shaft pulley 25 disposed on a lower left side of the tensioner pulley 23 and the water pump pulley 24, and an air-conditioner pulley 26 disposed on a lower right side of the water pump pulley 24 and the crank shaft pulley 25. Of these pulleys, the pulleys other than the tensioner pulley 23 and the water pump pulley 24 which are the flat pulleys are the ribbed pulleys. These ribbed pulleys and flat pulleys are formed of, e.g., a pressed metal product, a casted product, or a resin molded product made of nylon resin, phenol resin, etc., and each have a diameter of ϕ50 to 150 mm.

In the accessory drive belt transmission system 20, the V-ribbed belt B is wrapped around the power steering pulley 21 such that a V-rib-side surface of the V-ribbed belt B contacts the power steering pulley 21. Then, after the V-ribbed belt B is wrapped around the tensioner pulley 23 such that a back surface of the V-ribbed belt B contacts the tensioner pulley 23, the V-ribbed belt B is wrapped around the crank shaft pulley 25 and the air-conditioner pulley 26 in this order such that the V-rib-side surface of the V-ribbed belt B contacts the crank shaft pulley 25 and the air-conditioner pulley 26. Subsequently, the V-ribbed belt B is wrapped around the water pump pulley 24 such that the back surface of the V-ribbed belt B contacts the water pump pulley 24. Then, the V-ribbed belt B is wrapped around the AC generator pulley 22 such that the V-rib-side surface of the V-ribbed belt B contacts the AC generator pulley 22, followed by returning to the power steering pulley 21.

In the accessory drive belt transmission system 20 using the V-ribbed belt B of the first embodiment, the adhesive rubber layer 11 of the V-ribbed belt body 10 of the V-ribbed belt B contacting the cord 14 is made of the rubber composition containing ethylene-α-olefin elastomer as the rubber component and formed in such a manner that the rubber component is mixed with α,β-unsaturated fatty acid metallic salt and the resultant is crosslinked using sulfur. Thus, even if the V-ribbed belt B is wrapped around the pulleys with high tension or is wrapped around the small pulleys, sufficient durability can be ensured.

Next, the method for manufacturing the V-ribbed belt B of the first embodiment will be described with reference to FIGS. 3A to 3C.

In manufacturing of the V-ribbed belt B of the first embodiment, raw rubber is first mixed with each compounding ingredient, and the resultant is kneaded using a kneading machine such as a kneader or a Banbury mixer. The resultant non-crosslinked rubber composition is formed into a sheet by, e.g., calendering, thereby forming a non-crosslinked rubber sheet 11' for adhesive rubber layer 11 (i.e., a non-crosslinked rubber composition for belt formation). Similarly, a non-crosslinked rubber sheet 12' for compression rubber layer 12 is formed. In this case, in order to form the compression rubber layer 12 to contain short fibers 16 aligned in the belt width direction, a sheet containing short fibers 16 may be cut to a predetermined length, and the cut pieces may be connected together such that the short fibers 16 are aligned in a sheet width direction. In this manner, the non-crosslinked rubber sheet 12' may be formed. The treatment for dipping a woven fabric 13' to be a reinforcement fabric 13 in an RFL aqueous solution and then heating the woven fabric 13' and the adhesion treatment for coating a woven fabric part to be on the side close to a V-ribbed belt body 10 with rubber cement and then drying the woven fabric 13' are performed, and then both ends of the woven fabric 13' are bonded into a cylindrical shape. After the adhesion treatment for dipping twisted yarns 14' to be a cord 14 in a undercoating agent and an RFL aqueous solution and then heating the twisted yarns 14' is performed, the adhesion treatment for dipping the twisted yarns 14' in rubber cement and then heating and drying the twisted yarns 14' is performed.

Figure 3A:
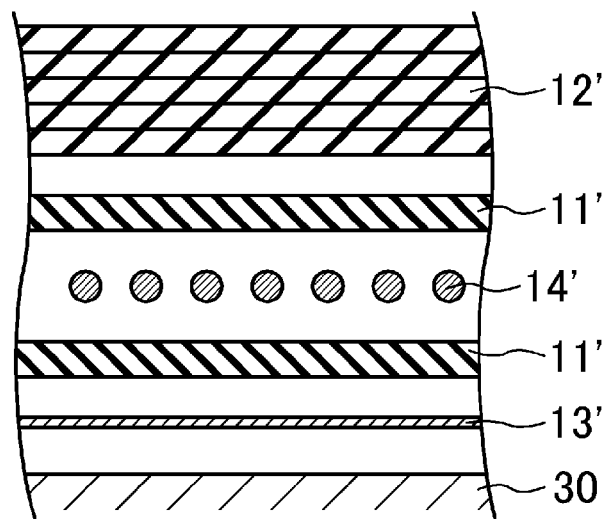
FIGS. 3A to 3C are views illustrating the method for manufacturing the V-ribbed belt of the first embodiment.
Figure 3B:
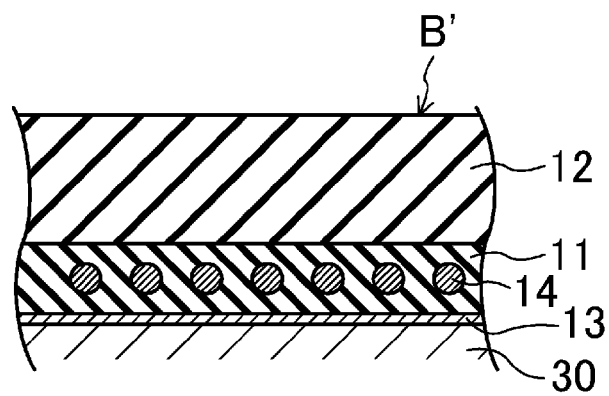
Figure 3C:
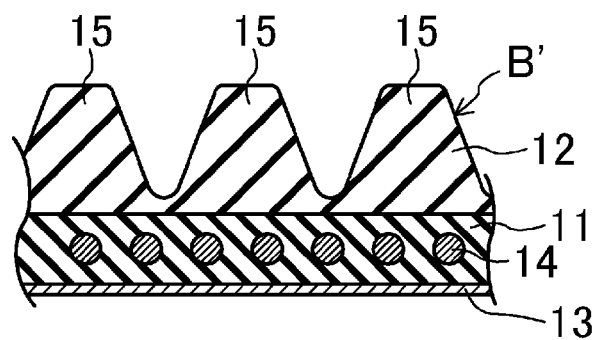

Next, referring to FIG. 3A, the woven fabric 13' to be the reinforcement fabric 13 is stacked on an outer circumferential surface of a cylindrical inner mold 30. Then, the non-crosslinked rubber sheet 11' for forming an outer part of the adhesive rubber layer 11 is winded around the woven fabric 13'. Subsequently, after the adhesion-treated twisted yarns 14' to be the cord 14 are spirally winded around the non-crosslinked sheet 11', another non-crosslinked rubber sheet 11' for forming an inner part of the adhesive rubber layer 11 is winded around the twisted yarns 14'. Then, the non-crosslinked rubber sheet 12' for forming the compression rubber layer 12 is further winded around the another non-crosslinked rubber sheet 11'.

Then, a rubber sleeve is stacked on the molded body formed on the inner mold 30, and then the molded body provided with the rubber sleeve is set in a molding furnace to heat the inner mold 30 with, e.g., high-temperature water vapor and to apply high pressure to press the rubber sleeve inward in a radial direction. At this point, the rubber component flows, and crosslinking reaction proceeds. Simultaneously, adhesion reaction of the twisted yarns 14' to rubber also proceeds to perform compounding as illustrated in FIG. 3B. As a result, a cylindrical belt slab B' (i.e., a belt body preform) is molded.

The belt slab B' is removed from the inner mold 30, and is divided into pieces in a length direction thereof. Then, each divided piece of the belt slab B' is, at an outer circumferential surface thereof, polished and cut such that V-ribs 15 are formed.

Finally, each divided piece of the belt slab B' having the outer circumferential surface formed with the V-ribs 15 is cut into rings having a predetermined width, and each ring-shaped belt is turned inside out. As a result, V-ribbed belts B are manufactured.

Second Embodiment

Figure 4:
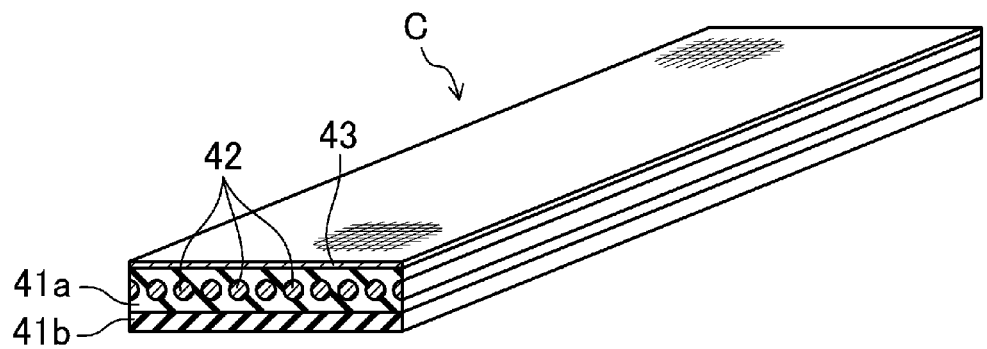
FIG. 4 is a perspective view of a flat belt of a second embodiment.

FIG. 4 illustrates a flat belt C of a second embodiment.

The flat belt C of the second embodiment is an endless belt used for the purpose of driving force transmission of, e.g., an air blower, a compressor, or a power generator or the purpose of transportation. The flat belt C of the second embodiment has, e.g., a length of 600 to 3000 mm, a width of 10 to 100 mm, and a thickness of 1.0 to 5.0 mm.

In the flat belt C of the second embodiment, an endless flat belt body is configured such that a strip-shaped adhesive rubber part (cord embedded part) 41a forming an outer belt part and a strip-shaped bottom rubber part 41b forming an inner belt part are integrally stacked on each other. In the flat belt C, a cord 42 is embedded in a middle part of the adhesive rubber part 41a in a thickness direction thereof so as to form a helical pattern with certain pitch in a belt width direction. Moreover, the flat belt C is, at an outer surface thereof, covered by a reinforcement fabric 43.

The adhesive rubber part 41a is formed in a strip shape so as to have a horizontally-oriented rectangular cross section, and has, e.g., a thickness of 0.4 to 1.5 mm. The adhesive rubber part 41a is made of a rubber composition formed in such a manner that a rubber component and various compounding ingredients are mixed together, and such a rubber composition is the same as that of the adhesive rubber layer 11 of the first embodiment.

The bottom rubber part 41b is formed in a strip shape so as to have a horizontally-oriented rectangular cross section, and has, e.g., a thickness of 0.5 to 2.0 mm. The bottom rubber part 41b is made of a rubber composition formed in such a manner that a rubber component and various compounding ingredients are mixed together. As in the compression rubber layer 12 of the first embodiment, examples of the rubber component include ethylene-propylene-dienemonomer rubber (EPDM), chloroprene rubber (CR), and hydrogenated acrylonitrile rubber (H-NBR). As in the compression rubber layer 12 of the first embodiment, examples of the compounding ingredients include a crosslinker, a vulcanization assistant, a vulcanization accelerator, an antioxidant, a plasticizer, a reinforcer, a filler, short fibers, and hollow particles. Note that the rubber composition forming the bottom rubber part 41b is formed in such a manner that the rubber component and the compounding ingredients are mixed and kneaded to form a non-crosslinked rubber composition and that the non-crosslinked rubber composition is heated, pressurized, and crosslinked. Such a rubber composition may be formed in such a manner that the non-crosslinked rubber composition is crosslinked using sulfur as the crosslinker or that the non-crosslinked rubber composition is crosslinked using an organic peroxide as the crosslinker.

As in the first embodiment, the cord 42 is formed of twisted yarns, to which the adhesion treatment using, e.g., an RFL aqueous solution is applied before formation of the cord 42, of polyethylene terephthalate (PET) fibers, polyvinyl alcohol (PVA) fibers, polyethylene naphthalate (PEN) fibers, para-aramid fibers, meta-aramid fibers, 4,6 nylon fibers, 6,6 nylon fibers, carbon fibers, or glass fibers. The cord 42 has, e.g., an outer diameter of 0.4 to 2.2 mm, and the pitch of the cord 42 in the belt width direction is 1.2 to 2 times as large as the outer diameter.

As in the first embodiment, the reinforcement fabric 43 is a woven fabric such as a plain-woven fabric formed of warps and wefts of polyester fibers or warps and wefts of cotton. In order to produce adhesiveness to the flat belt C, the treatment for dipping a woven fabric to be the reinforcement fabric 43 in an RFL aqueous solution and heating the woven fabric and the treatment for coating a woven fabric surface to be on the side close to the flat belt C with rubber cement and drying the woven fabric are performed before formation of the reinforcement fabric 43. The reinforcement fabric 43 has a thickness of, e.g., 0.5 to 2.0 mm.

Note that the flat belt C having the foregoing configuration can be manufactured by a well-known manufacturing method.

Figure 5:
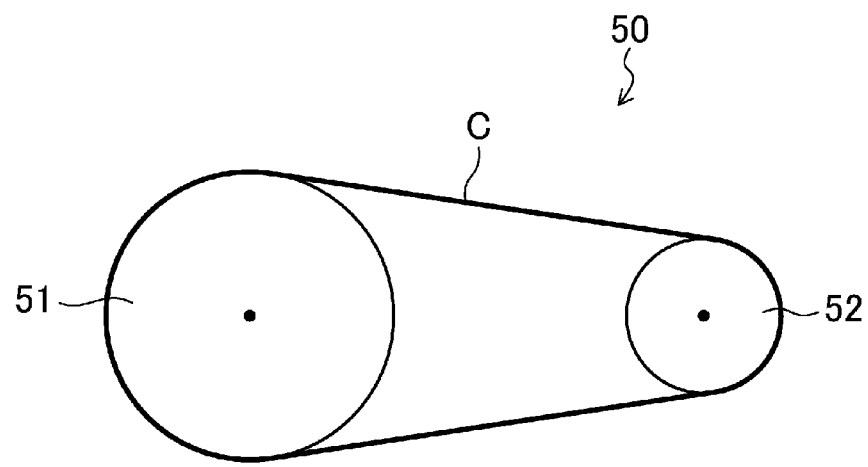
FIG. 5 is a view illustrating the layout of pulleys in a belt transmission system using the flat belt of the second embodiment.

FIG. 5 illustrates the layout of pulleys in a belt transmission system 50 using the flat belt C of the second embodiment.

The belt transmission system 50 is configured such that the flat belt C is wrapped around a pair of flat pulleys, i.e., a drive pulley 51 and a driven pulley 52, to transmit power. The diameter of the drive pulley 51 is, e.g., 50 to 200 mm, and the diameter of the driven pulley 52 is, e.g., 50 to 200 mm.

Other Embodiments

In the first and second embodiments, the V-ribbed belt B and the flat belt C have been described as the examples of the transmission belt. However, the present disclosure is not limited to such belts. The transmission belt of the present disclosure may be, e.g., a V belt or a toothed belt.

EXAMPLES

V-Ribbed Belt
V-ribbed belts of first to twelfth examples and first to twelfth comparative examples described below were prepared. Tables 1 to 3 show the characteristic configuration of each V-ribbed belt.

First Example

The V-ribbed belt of the first example was prepared in the same manner as that of the first embodiment. Specifically, the V-ribbed belt of the first example contains ethylene-propylene-dienemonomer rubber (EPDM) ("EP 22" manufactured by JSR Corporation) as a rubber component of a rubber composition forming an adhesive rubber layer. The followings were mixed with 100 parts by mass of the rubber component: 40 parts by mass of silica ("ULTRASIL VN3" manufactured by Evonik Japan and having a BET specific surface area of 175 $cm^2/g$); 40 parts by mass of FEF carbon black ("SEAST SO" manufactured by Tokai Carbon Co., Ltd. and having a DBP oil absorption of 115 $cm^3/100$ g); 15 parts by mass of oil ("SUNPAR 2280" manufactured by Japan Sun Oil Company, Ltd.); 1 part by mass of stearic acid (stearic acid "Tsubaki" manufactured by NOF Corporation); 5 parts by mass of zinc oxide ("zinc oxide type III" manufactured by Sakai Chemical Industry Co., Ltd.); 2 parts by mass of zinc dimethacrylate ("ACTOR ZMA" manufactured by Kawaguchi Chemical Industry Co., Ltd.); 1.5 parts by mass of phenol resin ("SUMILITE RESIN PR 12687" manufactured by Sumitomo Bakelite Co., Ltd.); 3 parts by mass of sulfur ("SEIMI OT" manufactured by Nippon Kanryu Industry Co., Ltd.); 1 part by mass of a thiazole-based vulcanization accelerator ("NOCCELER DM" manufactured by Ouchi Shinko Chemical Industrial Co., Ltd.); and 2 parts by mass of a thiuram-based vulcanization accelerator ("NOCCELER TBT" manufactured by Ouchi Shinko Chemical Industrial Co., Ltd.). The foregoing mixture was kneaded using a hermetically-sealed kneader. Then, the resultant was rolled into a non-crosslinked rubber composition sheet by calender rolls. An adhesive rubber layer was formed using the non-crosslinked rubber composition sheet. Thus, the silica content is 100% by mass with respect to the carbon black content. Moreover, the total content of FEF carbon black and silica is 80 parts by mass with respect to 100 parts by mass of the rubber component.

A compression rubber layer was made of a rubber composition formed in such a manner that ethylene-propylene-dienemonomer rubber (EPDM) is mixed with nylon short fibers and sulfur. The adhesion treatment for dipping twisted yarns of para-aramid fibers ("Technora" manufactured by Teijin Ltd.) in an RFL aqueous solution formed by mixing latex with an initial condensate of resorcin and formaldehyde and then heating the twisted yarns was performed before formation of a cord, and the cord was formed of such twisted yarns. A reinforcement fabric was formed of a rubberized cloth.

The V-ribbed belt of the first example has a circumferential length of 1180 mm, a thickness of 4.0 mm, a V-rib height of 2.0 mm, and three V-ribs (a belt width is 10.68 mm).

Second Example

The V-ribbed belt of the second example was formed so as to have the same configuration as that of the first example, except that the content of silica of the non-crosslinked rubber composition forming the adhesive rubber layer is 30 parts by mass with respect to 100 parts by mass of EPDM polymer. Thus, the silica content is 75% by mass with respect to the carbon black content. The total content of FEF carbon black and silica is 70 parts by mass with respect to 100 parts by mass of the rubber component.

Third Example

The V-ribbed belt of the third example was formed so as to have the same configuration as that of the first example, except that the content of silica of the non-crosslinked rubber composition forming the adhesive rubber layer is 45 parts by mass with respect to 100 parts by mass of EPDM polymer and that the carbon black content is 55 parts by mass with respect to 100 parts by mass of EPDM polymer. Thus, the silica content is 82% by mass with respect to the carbon black content. The total content of FEF carbon black and silica is 100 parts by mass with respect to 100 parts by mass of the rubber component.

Fourth Example

The V-ribbed belt of the fourth example was formed so as to have the same configuration as that of the first example, except that the content of silica of the non-crosslinked rubber composition forming the adhesive rubber layer is 60 parts by mass with respect to 100 parts by mass of EPDM polymer and that the carbon black content is 40 parts by mass with respect to 100 parts by mass of EPDM polymer. Thus, the silica content is 150% by mass with respect to the carbon black content. The total content of FEF carbon black and silica is 100 parts by mass with respect to 100 parts by mass of the rubber component.

Fifth Example

The V-ribbed belt of the fifth example was formed so as to have the same configuration as that of the first example, except that the content of silica of the non-crosslinked rubber composition forming the adhesive rubber layer is 50 parts by mass with respect to 100 parts by mass of EPDM polymer and that the carbon black content is 30 parts by mass with respect to 100 parts by mass of EPDM polymer. Thus, the silica content is 167% by mass with respect to the carbon black content. The total content of FEF carbon black and silica is 80 parts by mass with respect to 100 parts by mass of the rubber component.

Sixth Example

The V-ribbed belt of the sixth example was formed so as to have the same configuration as that of the first example, except that the content of silica of the non-crosslinked rubber composition forming the adhesive rubber layer is 60 parts by mass with respect to 100 parts by mass of EPDM polymer and that the carbon black content is 10 parts by mass with respect to 100 parts by mass of EPDM polymer. Thus, the silica content is 600% by mass with respect to the carbon black content. The total content of FEF carbon black and silica is 70 parts by mass with respect to 100 parts by mass of the rubber component.

Seventh Example

The V-ribbed belt of the seventh example was formed so as to have the same configuration as that of the first example, except that the content of silica of the non-crosslinked rubber composition forming the adhesive rubber layer is 90 parts by mass with respect to 100 parts by mass of EPDM polymer and that the carbon black content is 10 parts by mass with respect to 100 parts by mass of EPDM polymer. Thus, the silica content is 900% by mass with respect to the carbon black content. The total content of FEF carbon black and silica is 100 parts by mass with respect to 100 parts by mass of the rubber component.

Eighth Example

The V-ribbed belt of the eighth example was formed so as to have the same configuration as that of the first example, except that the content of zinc dimethacrylate of the non-crosslinked rubber composition forming the adhesive rubber layer is 0.5 part by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

Ninth Example

The V-ribbed belt of the ninth example was formed so as to have the same configuration as that of the first example, except that the content of zinc dimethacrylate of the non-crosslinked rubber composition forming the adhesive rubber layer is 3 parts by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

Tenth Example

The V-ribbed belt of the tenth example was formed so as to have the same configuration as that of the first example, except that the content of zinc dimethacrylate of the non-crosslinked rubber composition forming the adhesive rubber layer is 5 parts by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

Eleventh Example

The V-ribbed belt of the eleventh example was formed so as to have the same configuration as that of the first example, except that the content of sulfur of the non-crosslinked rubber composition forming the adhesive rubber layer is 2 parts by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

Twelfth Example

The V-ribbed belt of the twelfth example was formed so as to have the same configuration as that of the first example, except that the content of sulfur of the non-crosslinked rubber composition forming the adhesive rubber layer is 4 parts by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

First Comparative Example

The V-ribbed belt of the first comparative example was formed so as to have the same configuration as that of the first example, except that the content of silica of the non-crosslinked rubber composition forming the adhesive rubber layer is 20 parts by mass with respect to 100 parts by mass of EPDM polymer, that the carbon black content is 60 parts by mass with respect to 100 parts by mass of EPDM polymer, and that the zinc dimethacrylate content is 0 part by mass with respect to 100 parts by mass of EPDM polymer. Thus, the silica content is 33% by mass with respect to the carbon black content. The total content of FEF carbon black and silica is 80 parts by mass with respect to 100 parts by mass of the rubber component.

Second Comparative Example

The V-ribbed belt of the second comparative example was formed so as to have the same configuration as that of the first example, except that the content of zinc dimethacrylate of the non-crosslinked rubber composition forming the adhesive rubber layer is 0 part by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

Third Comparative Example

The V-ribbed belt of the third comparative example was formed so as to have the same configuration as that of the first example, except that the content of silica of the non-crosslinked rubber composition forming the adhesive rubber layer is 20 parts by mass with respect to 100 parts by mass of EPDM polymer and that the carbon black content is 50 parts by mass with respect to 100 parts by mass of EPDM polymer. Thus, the silica content is 40% by mass with respect to the carbon black content. The total content of FEF carbon black and silica is 70 parts by mass with respect to 100 parts by mass of the rubber component.

Fourth Comparative Example

The V-ribbed belt of the fourth comparative example was formed so as to have the same configuration as that of the first example, except that the content of silica of the non-crosslinked rubber composition forming the adhesive rubber layer is 30 parts by mass with respect to 100 parts by mass of EPDM polymer and that the carbon black content is 70 parts by mass with respect to 100 parts by mass of EPDM polymer. Thus, the silica content is 43% by mass with respect to the carbon black content. The total content of FEF carbon black and silica is 100 parts by mass with respect to 100 parts by mass of the rubber component.

Fifth Comparative Example

The V-ribbed belt of the fifth comparative example was formed so as to have the same configuration as that of the first example, except that the content of silica of the non-crosslinked rubber composition forming the adhesive rubber layer is 100 parts by mass with respect to 100 parts by mass of EPDM polymer and that the carbon black content is 10 parts by mass with respect to 100 parts by mass of EPDM polymer. Thus, the silica content is 1000% by mass with respect to the carbon black content. The total content of FEF carbon black and silica is 110 parts by mass with respect to 100 parts by mass of the rubber component.

Sixth Comparative Example

The V-ribbed belt of the sixth comparative example was formed so as to have the same configuration as that of the first example, except that the content of silica of the non-crosslinked rubber composition forming the adhesive rubber layer is 80 parts by mass with respect to 100 parts by mass of EPDM polymer and that the carbon black content is 0 part by mass with respect to 100 parts by mass of EPDM polymer.

Seventh Comparative Example

The V-ribbed belt of the seventh comparative example was formed so as to have the same configuration as that of the first example, except that the content of silica of the non-crosslinked rubber composition forming the adhesive rubber layer is 60 parts by mass with respect to 100 parts by mass of EPDM polymer and that the carbon black content is 60 parts by mass with respect to 100 parts by mass of EPDM polymer. Thus, the silica content is 100% by mass with respect to the carbon black content. The total content of FEF carbon black and silica is 120 parts by mass with respect to 100 parts by mass of the rubber component.

Eighth Comparative Example

The V-ribbed belt of the eighth comparative example was formed so as to have the same configuration as that of the first example, except that the content of silica of the non-crosslinked rubber composition forming the adhesive rubber layer is 80 parts by mass with respect to 100 parts by mass of EPDM polymer and that the carbon black content is 40 parts by mass with respect to 100 parts by mass of EPDM polymer. Thus, the silica content is 200% by mass with respect to the carbon black content. The total content of FEF carbon black and silica is 120 parts by mass with respect to 100 parts by mass of the rubber component.

Ninth Comparative Example

The V-ribbed belt of the ninth comparative example was formed so as to have the same configuration as that of the first example, except that the content of silica of the non-crosslinked rubber composition forming the adhesive rubber layer is 30 parts by mass with respect to 100 parts by mass of EPDM polymer and that the carbon black content is 30 parts by mass with respect to 100 parts by mass of EPDM polymer. Thus, the silica content is 100% by mass with respect to the carbon black content. The total content of FEF carbon black and silica is 60 parts by mass with respect to 100 parts by mass of the rubber component.

Tenth Comparative Example

The V-ribbed belt of the tenth comparative example was formed so as to have the same configuration as that of the first example, except that the content of zinc dimethacrylate of the non-crosslinked rubber composition forming the adhesive rubber layer is 7 parts by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

Eleventh Comparative Example

The V-ribbed belt of the eleventh comparative example was formed so as to have the same configuration as that of the first example, except that the content of sulfur of the non-crosslinked rubber composition forming the adhesive rubber layer is 1 part by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

Twelfth Comparative Example

The V-ribbed belt of the twelfth comparative example was formed so as to have the same configuration as that of the first example, except that the content of sulfur of the non-crosslinked rubber composition forming the adhesive rubber layer is 5 parts by mass with respect to 100 parts by mass of EPDM polymer. Thus, the silica content is 100% by mass with respect to the carbon black content. The total content of FEF carbon black and silica is 80 parts by mass with respect to 100 parts by mass of the rubber component.

TABLE 1

|  | 1st Example | 2nd Example | 3rd Example | 4th Example | 5th Example | 6th Example | 7th Example | 8th Example | 9th Example | 10th Example | 11th Example | 12th Example |
| --- | --- | --- | --- | --- | --- | --- | --- | --- | --- | --- | --- | --- |
| EPDM Polymer | 100 | 100 | 100 | 100 | 100 | 100 | 100 | 100 | 100 | 100 | 100 | 100 |
| Silica | 40 | 30 | 45 | 60 | 50 | 60 | 90 | 40 | 40 | 40 | 40 | 40 |
| Carbon Black | 40 | 40 | 55 | 40 | 30 | 10 | 10 | 40 | 40 | 40 | 40 | 40 |
| Oil | 15 | 15 | 15 | 15 | 15 | 15 | 15 | 15 | 15 | 15 | 15 | 15 |
| Stearic Acid | 1 | 1 | 1 | 1 | 1 | 1 | 1 | 1 | 1 | 1 | 1 | 1 |
| Zinc Oxide | 5 | 5 | 5 | 5 | 5 | 5 | 5 | 5 | 5 | 5 | 5 | 5 |
| Zinc Dimethacrylate | 2 | 2 | 2 | 2 | 2 | 2 | 2 | 0.5 | 3 | 5 | 2 | 2 |
| Phenol Resin | 1.5 | 1.5 | 1.5 | 1.5 | 1.5 | 1.5 | 1.5 | 1.5 | 1.5 | 1.5 | 1.5 | 1.5 |
| Sulfur | 3 | 3 | 3 | 3 | 3 | 3 | 3 | 3 | 3 | 3 | 2 | 4 |
| Accelerator DM | 1 | 1 | 1 | 1 | 1 | 1 | 1 | 1 | 1 | 1 | 1 | 1 |
| Accelerator TBT | 2 | 2 | 2 | 2 | 2 | 2 | 2 | 2 | 2 | 2 | 2 | 2 |

TABLE 2

|  | 1st Comparative Example | 2nd Comparative Example | 3rd Comparative Example | 4th Comparative Example | 5th Comparative Example | 6th Comparative Example | 7th Comparative Example | 8th Comparative Example | 9th Comparative Example | 10th Comparative Example | 11th Comparative Example | 12th Comparative Example |
| --- | --- | --- | --- | --- | --- | --- | --- | --- | --- | --- | --- | --- |
| EPDM Polymer | 100 | 100 | 100 | 100 | 100 | 100 | 100 | 100 | 100 | 100 | 100 | 100 |
| Silica | 20 | 40 | 20 | 30 | 100 | 80 | 60 | 80 | 30 | 40 | 40 | 40 |
| Carbon Black | 60 | 40 | 50 | 70 | 10 | 0 | 60 | 40 | 30 | 40 | 40 | 40 |
| Oil | 15 | 15 | 15 | 15 | 15 | 15 | 15 | 15 | 15 | 15 | 15 | 15 |
| Stearic Acid | 1 | 1 | 1 | 1 | 1 | 1 | 1 | 1 | 1 | 1 | 1 | 1 |
| Zinc Oxide | 5 | 5 | 5 | 5 | 5 | 5 | 5 | 5 | 5 | 5 | 5 | 5 |
| Zinc Dimethacrylate | 0 | 0 | 2 | 2 | 2 | 2 | 2 | 2 | 2 | 7 | 2 | 2 |
| Phenol Resin | 1.5 | 1.5 | 1.5 | 1.5 | 1.5 | 1.5 | 1.5 | 1.5 | 1.5 | 1.5 | 1.5 | 1.5 |
| Sulfur | 3 | 3 | 3 | 3 | 3 | 3 | 3 | 3 | 3 | 3 | 1 | 5 |
| Accelerator DM | 1 | 1 | 1 | 1 | 1 | 1 | 1 | 1 | 1 | 1 | 1 | 1 |
| Accelerator TBT | 2 | 2 | 2 | 2 | 2 | 2 | 2 | 2 | 2 | 2 | 2 | 2 |

TABLE 3

| Mixed Component | Contents |
|---|---|
| EPDM Polymer | Product Name: EP 22 Manufactured by JSR Corporation (Mooney Viscosity ML1 + 4@100° C.: 42, C2 Content: 54 wt %, Diene Content: 4.5 wt %) |
| Silica | Product Name: ULTRASIL VN3 Manufactured by Evonik Japan |
| Carbon Black | Product Name: SEAST SO Manufactured by Tokai Carbon Co., Ltd. |
| Oil | Product Name: SUNPAR 2280 Manufactured by Japan Sun Oil Company, Ltd. |
| Stearic Acid | Product Name: Stearic Acid Tsubaki Manufactured by NOF Corporation |
| Zinc Oxide | Product Name: Zinc Oxide Type III Manufactured by Sakai Chemical Industry Co., Ltd. |
| Zinc Dimethacrylate | Product Name: ACTOR ZMA Manufactured by Kawaguchi Chemical Industry Co., Ltd. |
| Phenol Resin | Product Name: SUMILITE RESIN PR 12687 Manufactured by Sumitomo Bakelite Co., Ltd. |
| Sulfur | Product Name: SEIMI OT Manufactured by Nippon Kanryu Industry Co., Ltd. |
| Accelerator DM | Product Name: NOCCELER DM Manufactured by Ouchi Shinko Chemical Industry Co., Ltd. |
| Accelerator TBT | Product Name: NOCCELER TBT Manufactured by Ouchi Shinko Chemical Industry Co., Ltd. |

(Test and Evaluation Methods)

<Dynamic Viscoelastic Measurement>

Rubber sheets having the same composition as those of the rubber compositions forming the adhesive rubber layers of the V-ribbed belts of the first to twelfth examples and the first to twelfth comparative examples were formed by press molding. Then, a strip-shaped test piece whose length direction is along a grain direction corresponding to a belt length direction was cut out of each rubber sheet. The dynamic viscoelasticity of each test piece was, according to JIS K6394, measured using a dynamic viscoelastic measurement apparatus (DMA) ("RSAIII" manufactured by TA Instruments Japan), thereby obtaining the complex modulus of each test piece. The measurement conditions were a temperature atmosphere of 120° C., a tension mode, a frequency of 10 Hz, a dynamic strain of 1.0%, and a static load of 0.294 MPa.

<Adhesive Force Measurement>

Figure 6:
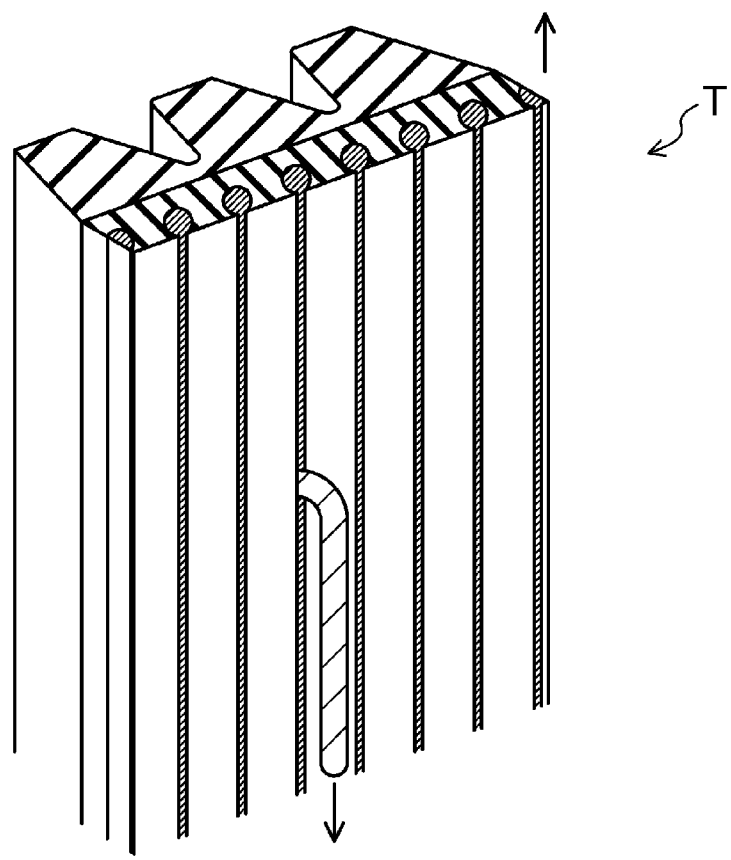
FIG. 6 is a perspective view of a test piece for cord adhesive force test.
Figure 7:
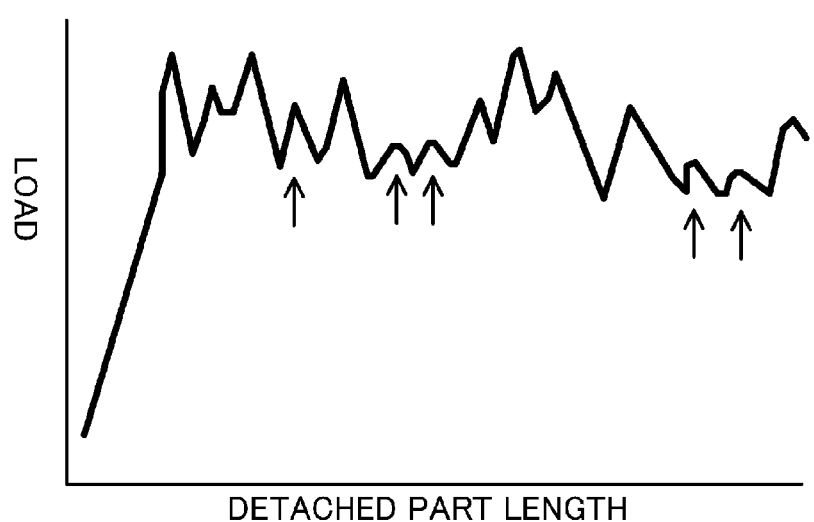
FIG. 7 is a graph showing an example test chart in cord adhesive force measurement.

Referring to FIG. 6, a strip-shaped belt piece having a length of 150 mm was cut out in such a manner that each V-ribbed belt of the first to twelfth examples and the first to twelfth comparative examples is cut in a width direction thereof, and a reinforcement fabric was detached from the belt piece to expose side surfaces of cord parts. In this manner, test pieces T were prepared. A middle one of the cord parts in the width direction of the test piece T was detached from one end toward the other end of the test piece T in the length direction thereof until the length of the detached part of the cord part reaches about 80 mm. Under an atmosphere of 120° C., the end of the test piece T from which the cord part is detached and the end of the detached part of the cord part were fixed respectively to chucks of a tensile test machine, and the adhesive force of the cord was measured at a tensile speed of 50 mm/min. The relative value of the adhesive force of each V-ribbed belt of the first to twelfth examples and the second to twelfth comparative examples was calculated where the adhesive force of the first comparative example is taken as 1.00. Note that a test chart was obtained as shown in FIG. 7, and the average of first to fifth lowest peak values of the test chart was taken as the value of the adhesive force. The test was performed for two test pieces T of each V-ribbed belt, and the data showing a lower adhesive force was taken.

<Durability Test>

Figure 8:
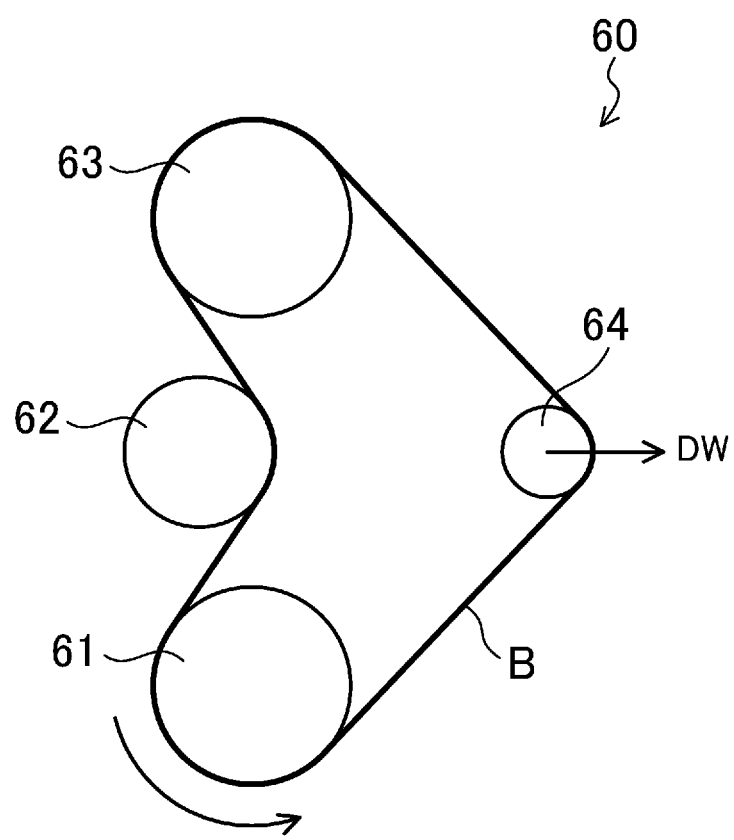
FIG. 8 is a view illustrating the layout of pulleys in a belt running test machine.

FIG. 8 illustrates a belt running test machine 60 for testing the durability of a V-ribbed belt.

The belt running test machine 60 includes a drive pulley 61 which is a ribbed pulley having a diameter of 120 mm, an idler pulley 62 provided on an upper left side of the drive pulley 61 and having a diameter of 85 mm, a first driven pulley 63 which is a ribbed pulley provided on an upper right side of the idler pulley 62 and having a diameter of 120 mm, and a tension pulley 64 which is a ribbed pulley provided on an upper right side of the drive pulley 61 and a lower right side of the first driven pulley 63 and having a diameter of 45 mm. The V-ribbed belt B is wrapped around the idler pulley 62 such that a belt wrapping angle ($\theta_1$) is 120 degrees, and is wrapped around the tension pulley 64 such that a belt wrapping angle ($\theta_2$) is 90 degrees. The tension pulley 64 is capable of moving right and left and receiving a certain axial load, i.e., a certain dead weight DW, applied toward the right so that belt tension is loaded to the wrapped V-ribbed belt B.

Each V-ribbed belt B of the first to twelfth examples and the first to twelfth comparative examples was wrapped such that V-ribs 15 of a compression rubber layer 12 contact the drive pulley 61, the first driven pulley 63, and the tension pulley 64 of the belt running test machine 60 and that a surface of a reinforcement fabric 13 contacts the idler pulley 62 of the belt running test machine 60. Then, a dead weight DW of 9.06 N was loaded to the drive pulley 61 toward the right. Subsequently, under an atmosphere of 120° C., the drive pulley 61 rotated at a rotational speed of 4900 rpm to run the V-ribbed belt. Then, the state of part of the belt where defects initially occurred was recorded. Even after occurrence of the initial defects in the belt, the belt was running until defects occurred at the periphery of a cord. The belt running time from the start of running to occurrence of the defects at the periphery of the cord was measured. The relative value of the running time of each V-ribbed belt B was calculated where the running time of the first comparative example is taken as 1.00.

(Test and Evaluation Results)

The test and evaluation results are shown in Tables 4 to 6.

TABLE 4

|  | 1st Example | 2nd Example | 3rd Example | 4th Example | 5th Example | 6th Example |
|---|---|---|---|---|---|---|
| Complex Modulus E*120° C. (MPa) | 22.87 | 20.46 | 26.98 | 27.58 | 23.12 | 22.75 |

|  | 7th Example | 8th Example | 9th Example | 10th Example | 11th Example | 12th Example |
|---|---|---|---|---|---|---|
| Complex Modulus E*120° C. (MPa) | 29.71 | 23.21 | 21.73 | 20.71 | 21.10 | 25.39 |

TABLE 4-continued

|  | 1st Comparative Example | 2nd Comparative Example | 3rd Comparative Example | 4th Comparative Example | 5th Comparative Example | 6th Comparative Example |
|---|---|---|---|---|---|---|
| Complex Modulus E*120° C. (MPa) | 22.81 | 23.86 | 19.15 | 25.77 | 33.20 | 26.98 |

|  | 7th Comparative Example | 8th Comparative Example | 9th Comparative Example | 10 Comparative Example | 11th Comparative Example | 12th Comparative Example |
|---|---|---|---|---|---|---|
| Complex Modulus E*120° C. (MPa) | 35.31 | 37.12 | 18.15 | 18.52 | 20.30 | 27.27 |

The complex modulus of the adhesive rubber layer at 120° C. was 22.87 MPa in the first example, 20.46 MPa in the second example, 26.98 MPa in the third example, 27.58 MPa in the fourth example, 23.12 MPa in the fifth example, 22.75 MPa in the sixth example, 29.71 MPa in the seventh example, 23.21 MPa in the eighth example, 21.73 MPa in the ninth example, 20.71 MPa in tenth example, 21.10 MPa in the eleventh example, and 25.39 MPa in the twelfth example. Moreover, the complex modulus of the adhesive rubber layer at 120° C. was 22.81 MPa in the first comparative example, 23.86 MPa in the second comparative example, 19.15 MPa in the third comparative example, 25.77 MPa in the fourth comparative example, 33.20 MPa in the fifth comparative example, 26.98 MPa in the sixth comparative example, 35.31 MPa in the seventh comparative example, 37.12 MPa in the eighth comparative example, 18.15 MPa in the ninth comparative example, 18.52 MPa in tenth comparative example, 20.30 MPa in the eleventh comparative example, and 27.27 MPa in the twelfth comparative example.

The adhesive force of the cord was, where the adhesive force of the first comparative example is taken as 1.00, 1.58 in the first example, 1.45 in the second example, 1.40 in the third example, 1.49 in the fourth example, 1.67 in the fifth example, 1.71 in the sixth example, 1.68 in the seventh example, 1.40 in the eighth example, 1.79 in the ninth example, 1.95 in the tenth example, 1.44 in the eleventh example, and 1.63 in the twelfth example. Moreover, the adhesive force of the cord was, where the adhesive force of the first comparative example is taken as 1.00, 1.15 in the second comparative example, 1.35 in the third comparative example, 1.32 in the fourth comparative example, 1.64 in the fifth comparative example, 1.65 in the sixth comparative example, 1.33 in the seventh comparative example, 1.38 in the eighth comparative example, 1.40 in the ninth comparative example, 1.19 in the tenth comparative example, 1.25 in the eleventh comparative example, and 1.67 in the twelfth comparative example.

TABLE 5

|  | 1st Example | 2nd Example | 3rd Example | 4th Example | 5th Example | 6th Example |
|---|---|---|---|---|---|---|
| Cord Adhesive Force (1st comparative example taken as 1) | 1.58 | 1.45 | 1.40 | 1.49 | 1.67 | 1.71 |

|  | 7th Example | 8th Example | 9th Example | 10th Example | 11th Example | 12th Example |
|---|---|---|---|---|---|---|
| Cord Adhesive Force (1st comparative example taken as 1) | 1.68 | 1.40 | 1.79 | 1.95 | 1.44 | 1.63 |

|  | 1st Comparative Example | 2nd Comparative Example | 3rd Comparative Example | 4th Comparative Example | 5th Comparative Example | 6th Comparative Example |
|---|---|---|---|---|---|---|
| Cord Adhesive Force (1st comparative example taken as 1) | 1.00 | 1.15 | 1.35 | 1.32 | 1.64 | 1.65 |

|  | 7th Comparative Example | 8th Comparative Example | 9th Comparative Example | 10th Comparative Example | 11th Comparative Example | 12th Comparative Example |
|---|---|---|---|---|---|---|
| Cord Adhesive Force (1st comparative example taken as 1) | 1.33 | 1.38 | 1.40 | 1.19 | 1.25 | 1.67 |

TABLE 6

|  | 1st Example | 2nd Example | 3rd Example | 4th Example | 5th Example | 6th Example |
|---|---|---|---|---|---|---|
| Belt Running Test (1st comparative example taken as 1) | 2.55 | 2.33 | 2.11 | 2.49 | 2.67 | 2.42 |
| Defect State | Rib Rubber Cracking | Rib Rubber Cracking | Rib Rubber Cracking | Rib Rubber Cracking | Rib Rubber Cracking | Rib Rubber Cracking |
|  | 7th Example | 8th Example | 9th Example | 10th Example | 11th Example | 12th Example |
| Belt Running Test (1st comparative example taken as 1) | 2.03 | 2.08 | 2.75 | 2.50 | 2.11 | 2.39 |
| Defect State | Rib Rubber Cracking | Rib Rubber Cracking | Rib Rubber Cracking | Rib Rubber Cracking | Rib Rubber Cracking | Rib Rubber Cracking |
|  | 1st Comparative Example | 2nd Comparative Example | 3rd Comparative Example | 4th Comparative Example | 5th Comparative Example | 6th Comparative Example |
| Belt Running Test (1st comparative example taken as 1) | 1.00 | 1.10 | 1.49 | 1.31 | 1.68 | 1.79 |
| Defect State | Belt Breakdown | Belt Breakdown | Belt Breakdown | Belt Breakdown | Belt Breakdown | Cord Detachment |
|  | 7th Comparative Example | 8th Comparative Example | 9th Comparative Example | 10th Comparative Example | 11th Comparative Example | 12th Comparative Example |
| Belt Running Test (1st comparative example taken as 1) | 1.59 | 1.63 | 1.29 | 1.91 | 1.85 | 1.93 |
| Defect State | Belt Breakdown | Belt Breakdown | Belt Breakdown | Cord Detachment | Cord Detachment | Cord Detachment |

The belt running time from the start of running to occurrence of the defects at the periphery of the cord was, where the belt running time of the first comparative example is taken as 1.00, 2.55 in the first example, 2.33 in the second example, 2.11 in the third example, 2.49 in the fourth example, 2.67 in the fifth example, 2.42 in the sixth example, 2.03 in the seventh example, 2.08 in the eighth example, 2.75 in the ninth example, 2.50 in the tenth example, 2.11 in the eleventh example, and 2.39 in the twelfth example. Moreover, the belt running time from the start of running to occurrence of the defects at the periphery of the cord was, where the belt running time of the first comparative example is taken as 1.00, 1.10 in the second comparative example, 1.49 in the third comparative example, 1.31 in the fourth comparative example, 1.68 in the fifth comparative example, 1.79 in the sixth comparative example, 1.59 in the seventh comparative example, 1.63 in the eighth comparative example, 1.29 in the ninth comparative example, 1.91 in the tenth comparative example, 1.85 in the eleventh comparative example, and 1.93 in the twelfth comparative example.

The state of part of the belt where the defects initially occurred in belt running was cracking of the compression rubber layer in the first to twelfth examples, breakdown of the V-ribbed belt in the first to fifth and seventh to ninth comparative examples, and detachment of the cord from the adhesive rubber layer in the sixth and tenth to twelfth comparative examples.

The present disclosure is useful for a transmission belt.

The embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:
1. A transmission belt comprising:
a cord embedded in a belt body made of a rubber composition,
wherein at least part of the belt body contacting the cord is made of a rubber composition containing ethylene-α-olefin elastomer as a rubber component and formed in such a manner that the rubber component is mixed with silica, carbon black and an α,β-unsaturated fatty acid metallic salt and then is crosslinked using sulfur,
wherein a content of the sulfur is 2 to 4 parts by mass with respect to 100 parts by mass of the rubber component, a content of the silica is 30 to 90 parts by mass with respect to 100 parts by mass of the rubber component, a content of the carbon black is 10 to 55 parts by mass with respect to 100 parts by mass of the rubber component and a content of the α,β-unsaturated fatty acid metallic salt is 0.5 to 5 parts by mass with respect to 100 parts by mass of the rubber component, and wherein a sum of the content of the carbon black and the silica is 70 to 100 parts by mass with respect to 100 parts by mass of the rubber component.

2. The transmission belt of claim 1, wherein the α,β-unsaturated fatty acid metallic salt is zinc dimethacrylate.

3. The transmission belt of claim 1, wherein a content of the silica is equal to or greater than 75% by mass with respect to a content of the carbon black.

4. The transmission belt of claim 1, wherein the carbon black is FEF carbon black.

5. The transmission belt of claim 1, wherein a BET adsorption specific surface area of the silica is 50 to 200 cm2/g.

6. The transmission belt of claim 1, wherein a complex modulus of the rubber composition is 20 to 30 MPa measured under conditions of a temperature atmosphere of 120° C., a tension mode, a frequency of 10 Hz, a dynamic strain of 1.0%, and a static load of 0.294 MPa, according to JIS K6394.

7. The transmission belt of claim 1, wherein the belt body is a V-ribbed belt body or a flat belt body.

8. The transmission belt of claim 1, wherein the content of the sulfur is 2.5 to 4 parts by mass with respect to 100 parts by mass of the rubber component.

9. The transmission belt of claim 1, wherein a ratio by mass of the silica to the carbon black is in a range from 75 to 900.

* * * * *